ated Jan. 17, 1967

3,299,119
2-CYANOSORBAMIDE

Martin E. Cupery, Wilmington, Del., assignor to E. I. du Pont de Nemours and Company, Wilmington, Del., a corporation of Delaware
No Drawing. Filed Mar. 10, 1965, Ser. No. 438,723
1 Claim. (Cl. 260—465.4)

This invention relates to a cyanoacetamide derivative and to methods of protecting seeds from attack by fungi.

More particularly, this invention refers to 2-cyanosorbamide having the chemical structure:

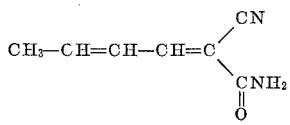

and to a method of protecting seeds from fungi by applying a fungicidal amount of this compound to seeds.

In many areas of the world there is a mere 10 to 20 percent germination rate from planted seeds. This is brought about by the destructiveness of soil fungi. Although chemical seed protectants are known, there is no known universal plant fungicide which satisfies all needs. Accordingly, new, more efficient seed protectants are needed.

If one were to plant a bushel of quality seeds in sterile soil, one would normally expect about 90 to 95% germination. This expected germination is decreased by the presence of seed-attacking fungi. Any chemical compound placed on a seed which will cause 90 to 95% of a given quantity of seeds to germinate is considered to be 100% effective in protecting the seeds from pathogenic fungi.

I have discovered that seeds of beans, sorghum, cucumber, corn and many other plants can be effectively protected from a wide spectrum of seed-attacking fungi by applying to them 2-cyanosorbamide. Seeds treated with my compound will have germination approaching 100% of the germination of seed in sterile soil. No phytotoxicity is noted on the seedlings if rates of application correspond to those which I have set forth below.

PREPARATION

The compound of my invention, 2-cyanosorbamide, is prepared by the reaction of crotonaldehyde with cyanoacetamide in aqueous alcohol containing a small amount of pyridine.

COMPOSITIONS

Seed treating compositions employing the 2-cyanosorbamide of my invention can be prepared by admixing with the 2-cyanosorbamide a carrier material or conditioning agent of the kind used and commonly referred to in the art as a fungicide adjuvant or modifier. Usually from about 1 to 95% by weight of the fungicidal composition will comprise the active ingredient.

The conventional fungicide adjuvants are inert solids, liquid diluents and surface-active agents. They provide compositions adapted for ready and efficient application using conventional applicator equipment. Thus, the compound used in my invention can be admixed with a fungicide adjuvant material to provide a formulation in solid or liquid form.

Solid compositions are preferably in the form of powders. They are compounded to be homogeneous powders that can be used as such or diluted with inert solids to form dusts or suspensions in a suitable liquid medium for application.

The powders can comprise principally the active ingredient and minor amounts of conditioning agents. They can also be prepared by mixing the active compound with finely divided inert solids. Natural clays such as attapulgite, china clays including kaolinite or montmorillonites, diatomaceous earths, walnut shell flour, redwood flour, synthetic fine silica, calcium silicate and similar inert solid carriers can be used.

The active ingredient will be present in an amount from 1 to 75% by weight in these dust compositions.

Liquid compositions employing the fungicidal compound of my invention are prepared by mixing the active ingredient with a suitable liquid diluent material. The active ingredient can be either in solution or suspension in the liquid media. Typical of the liquid media commonly employed as fungicide adjuvants are water, kerosene, Stoddard solvent, xylene, alcohols, alkylated naphthalene and glycols.

The 2-cyanosorbamide makes up from 0.5 to 50% of these liquid compositions. Some of these compositions are designed to be used as such. Others can be extended with large quantities of water.

Compositions in the form of wettable powders or liquids in many cases also include a surface-active agent of the kind sometimes referred to in the art as a wetting, dispersing or emulsifying agent. These materials cause the composition to wet, disperse or emulsify easily in water so as to give aqueous sprays.

Such surface-active agents also known as surfactants can include anionic, cationic and non-ionic agents as have heretofore been generally employed in fungicide compositions of similar type. A detailed list of such agents is set forth in "Detergents and Emulsifiers Annual— 1964" by John W. McCutcheon, Inc. This list is herein incorporated by reference.

The particular surfactant used in a given formulation can be readily determined by an expert in the art.

Dyes and pigments can also be used in the compositions of my invention. Preferred compositions can contain from 0.01 to 5% by weight of one or more dyes. Included are xanthene dyes such as rhodamine B and rhodamine B extra; cationic dyes such as "Sevron" Red; and oil-soluble dyes such as spirit soluble red. Other dyes such as malachite green, methyl violet and the like can be used.

In other preferred compositions, from 0.1 to 15% by weight of a pigment can be employed. Preferred pigments are: "Watchung" Red B [4-(5-chloro-2-sulfo-p-tolylazo)-3-hydroxy-2-naphthoic acid, calcium salt], lithol Red [2-(2-hydroxy-1-naphthylazo)-1-naphthalene sulfonic acid, barium salt], "Monastral" Blue or Green [phthalocyanine pigments], "Lithogol" Red, and inorganic pigments such as Miloric Blue [ferric ferrocyanide] or Chrome Yellow [Lead Chromate]. These pigments can be used in their dry or wet paste form upon addition to the compositions of my invention. Thorough blending and grinding is desirable to obtain adequate distribution and color in these compositions.

Compositions containing dyes and pigments give a high degree of coloration to seeds treated with the compound used in my invention, so that treated seed can be recorgnized clearly, and confusion between treated seed for planting and untreated seed for foodstuffs can be avoided.

Other ingredients in the compositions of this invention can be fertilizers, corrosion inhibitors, antifoam agents, antidusting oils and similar additives, which can be used to give these compositions particularly desirable properties.

Compositions of this invention can also advantageously contain 2-cyanosorbamide in combination with known fungicides and seed protecting agents. Particularly advantageous are tetramethylthiuram disulfide, other tetraalkylthiuram disulfides, dithiocarbamates such as manganese or zinc ethylenebisdithiocarbamate and ferric, zinc manganese and other heavy metal salts of dimethyldithiocarbamic acid, ethylmethyldithiocarbamic acid, n-butyldithiocarbamic acid and of other dithiocarbamic acids, derived from primary and secondary amines.

Other suitable materials include derivatives of rhodanine, such as 3-(p-chlorophenyl)-5-methylrhodanine, N-trichloromethylmercapto - 4 - cyclohexene - 1,2, - dicarboxamide, N-trichloromethylmercaptophthalimide, N-(1, 1,2,2 - tetrachloroethylsulfonyl)cis - Δ - 4 - cyclohexene-1,2-dicarboximide, methylmercury derivatives such as methylmercury p-toluene sulfonanilide, methylmercury acetate, methylmercury phosphate, methylmercury dicyandiamine or methylmercury dihydroxylproplymercaptide and the analogous ethylmercury derivatives, 2,3-dichloro-1,4-naphthoquinone, tetrachloro-p-benzoquinone, 2,4-dichloro - 6 - chloroanilinotriazine, phenylmercury compounds, pentachlorophenol, hexachlorobenzene, pentachloronitrobenzene, tetrachloronitroanisole, tetrachloroisophthalonitrile and copper quinolinate.

Particularly useful compositions comprise 2-cyanosorbamide with an insecticidal compound such as 1-naphthyl-N-methylcarbamate, methoxychlor, DDT, BHC, malathion and lindane. These compositions can be used to destroy insects that attack stored grain.

Compounds such as dieldrin, aldrin and heptachlor are used with 2-cyanosorbamide if it is also an object to destroy soil insects.

APPLICATION

The compound of my invention can be applied to the seed by spraying, by pelleting, by mixing in conventional slurry treaters or by dust treatments in drillbox or hopper box.

The compound, 2-cyanosorbamide, is applied to seeds at a rate generally within the range of from 1/16 of an ounce to about 20 ounces per 100 pounds of seed. In pelleted seed applications, somewhat higher rates are generally used, such as in the order of from ¼ ounce to as high as 4 pounds and even higher per 100 pounds of seed. The exact rate can readily be determined within these ranges in accordance with well-known procedures.

The following examples are provided in addition to those set forth above to more clearly set forth this invention. All percentages in these examples are parts by weight.

Example 1

A solution of twenty-one grams of cyanoacetamide in ninety milliliters of ethanol, fifty milliliters of water and five milliliters of pyridine is stirred with fifteen grams of crotonaldehyde for one hour. The reactants are left standing overnight. The resulting white paste is diluted with 200 milliliters of ether, filtered and the solid washed with ether. Recrystallization from aqueous ethanol gives 2-cyanosorbamide melting at 158° C.

The above synthesized compound is formulated as follows:

|  | Percent |
|---|---|
| 2-cyanosorbamide | 5 |
| Fuller's earth | 95 |

The above components are blended and micropulverized to give a composition suitable for application to seeds as a dust.

The formulation is applied at the rate of 2 ounces of active ingredient per 100 pounds of corn, sorghum, and cucumber seeds. The seeds are planted in soil heavily infested with seed rotting fungi. The soil is maintained at a temperature of 50° F. for eight days with corn and for two days with the sorghum and the cucumber seeds to provide optimum seed rot conditions. The test beds are then placed in a greenhouse and time is allowed for seed germination. A count is then made of the healthy plants.

It is found that the percent of corn seed emerging as healthy plants ranges from 4 to 16 times that of untreated seed. The percent of sorghum seed emerging as healthy plants ranges from 2 to 3½ times that of untreated seed. The percent of cucumber seed emerging as healthy plants ranges from 3 to 5 times that of untreated seed.

Example 2

|  | Percent |
|---|---|
| 2-cyanosorbamide | 50.00 |
| Sodium lignin sulfonate | 2.00 |
| Alkylnaphthalene sulfonic acid, Na salt | 1.00 |
| Ethylene glycol | 0.50 |
| Watchung Red Lake | 0.15 |
| Oil soluble red dye | 0.10 |
| Calcined montmorrillonite clay | 46.25 |

The above components are blended and micropulverized to give a composition suitable for application to seeds either as a dust or as a liquid slurry in water.

Treatment of cotton seeds with this composition at the rate of 4 ounces of active ingredient per 100 pounds of cotton seed permits the seed to establish a healthy stand in infested soil.

Example 3

A dust formulation is prepared by carefully blending and grinding the following:

|  | Percent |
|---|---|
| 8-cyanosorbamide | 5 |
| Pikes Peak clay | 95 |

This dust is applied to corn by permitting the corn to pick up the maximum amount of dust which the surface can hold. The seed is planted in infested soil and stored for six days at 50° F. to give seed rotting organisms in the soil the opportunity to attack the planted seed. The seed is then brought to the greenhouse for germination. Of the seeds treated 98% germinate, compared with only 31% germination for the untreated control. In the same test thiram, a commercial seed treating agent, gives 82% germination.

Example 4

|  | Percent |
|---|---|
| 2-cyanosorbamide | 70.0 |
| Malathion (95% technical) | 2.0 |
| Partially desulfonated sodium lignin sulfonate | 1.5 |
| Sodium alkylnaphthalene sulfonate | 1.5 |
| Kaolin clay | 25.0 |

This formulation is prepared by blending all of the solid materials thoroughly in a ribbon blender and then adding the malathion by spraying it over the blending mass. This mixture is ground in a hammer mill until the particle size is substantially less than 50 microns. The product is applied to corn seed at the rate of 1 ounce per bushel. The treated corn is protected against attack by stored grain insects, and, after planting in infested soil, gives excellent germination and seedling emergence.

Example 5

|  | Percent |
|---|---|
| 2-cyanosorbamide | 50.00 |
| Dieldrin, technical | 20.00 |
| "Watchung" Red B pigment | 10.00 |
| Dodecylphenol polyoxyethylene | 2.00 |
| Calcium lignosulfonate | 0.50 |
| Synthetic fine silica | 2.00 |
| Attapulgite clay | 15.50 |

The mixture is prepared by blending and grinding the ingredients into a homogeneous, finely divided powder. The product is applied as an aqueous slurry or as a dust to seeds such as vine crops, sorghum, small grains, rice, peas, corn, beans and the like to protect the seed against attack from soil fungi and soil insects.

*Example 6* — Percent
- 2-cyanosorbamide —— 25.0
- Methoxychlor —— 5.0
- Sodium lignosulfonate —— 0.5
- Isooctylphenol polyethoxyethanol —— 1.7
- Bentonite clay —— 3.0
- Kaolinite clay —— 55.0
- Orange G dye —— 1.5
- Rhodamine B dye —— 0.3
- Antidusting oil —— 8.0

This product is prepared by blending the dry ingredients, spraying the oil into the mixture, blending further and grinding the mixture. The product is applied to seed such as corn and sorghum in a slurry treater. Excellent germination is noted.

*Example 7* — Percent
- 2-cyanosorbamide —— 25
- Watchung Red pigment —— 10
- Calcium/magnesium lignin sulfonate —— 1
- Alkylnaphthalene sulfonate, sodium salt —— 1
- Talc —— 63

This dust is prepared by blending the ingredients in a blender, followed by grinding in an impact mill. This product is applied to vine crops, such as cucumbers, cantaloupe or watermelon seeds by tumbling the seed with the treatment at the rate of 4½ ounces per cwt. of seed. The treated seed gives excellent germination and emergence from soil infested with pathogenic soil fungi.

*Example 8* — Percent
- 2-cyanosorbamide —— 4
- Pentachloronitrobenzene —— 10
- Barium Lithol Red pigment —— 1
- Talc —— 45
- Calcium carbonate coated with calcium oleate —— 40

The above mixture is prepared by blending the active ingredients, the pigment and approximately half of the talc and grinding the blend in an Entoleter mill. The dust concentrate is then further diluted by blending with the remainder of the talc and the coated calcium carbonate. This mixture is applied to cotton seed by mixing the dust with the cotton seed in the hopper box at a ratio of 10 pounds dust per cwt. of seed. Excellent germination and stand of cotton seedlings is obtained after planting.

*Example 9* — Percent
- 2-cyanosorbamide —— 25.00
- Sodium alkylnaphthalenesulfonate —— 1.00
- Mixed sodium and calcium lignin sulfonates —— 6.00
- Hydrated atapulgite clay —— 2.00
- Monobasic potassium phosphate —— 1.00
- Phenylmercury acetate —— 0.25
- Water —— 64.75

Ingredients are ground in a sand-mill to produce particles all below 5 microns in a stable suspension. This composition is applied to small grains by diluting with water and applying the diluted slurry in a Mist-O-Matic treater.

The 2-cyanosorbamide of this invention has been found to be most effective against the following seed rotting fungi:

Pythium sp.
Fusarium sp.

The invention claimed is:
2-cyanosorbamide.

References Cited by the Examiner
UNITED STATES PATENTS

| | | | |
|---|---|---|---|
| 2,452,429 | 10/1948 | Carlisle | 167—22 |
| 3,012,061 | 12/1961 | Boffa | 260—465.4 |
| 3,065,127 | 11/1962 | Heininger | 167—22 |
| 3,121,108 | 2/1964 | Josey | 260—465.4 |

CHARLES B. PARKER, *Primary Examiner.*

JULIAN S. LEVITT, *Examiner.*

J. D. GOLDBERG, J. P. BRUST, *Assistant Examiners.*